(12) United States Patent
Kurzynski (10) Patent No.: US 11,395,944 B2
(45) Date of Patent: Jul. 26, 2022

(54) CONVERTIBLE SPORTS EQUIPMENT CADDY

(71) Applicant: Douglas Matthew Kurzynski, Verona, KY (US)

(72) Inventor: Douglas Matthew Kurzynski, Verona, KY (US)

( * ) Notice: Subject to any disclaimer, the term of this patent is extended or adjusted under 35 U.S.C. 154(b) by 507 days.

(21) Appl. No.: 16/342,832

(22) PCT Filed: Jan. 4, 2018

(86) PCT No.: PCT/US2018/012329
§ 371 (c)(1),
(2) Date: Apr. 17, 2019

(87) PCT Pub. No.: WO2018/129145
PCT Pub. Date: Jul. 12, 2018

(65) Prior Publication Data
US 2019/0255402 A1 Aug. 22, 2019

Related U.S. Application Data

(60) Provisional application No. 62/442,116, filed on Jan. 4, 2017.

(51) Int. Cl.
| | |
|---|---|
| *A63B 55/30* | (2015.01) |
| *A63B 55/40* | (2015.01) |
| *A45C 5/14* | (2006.01) |
| *A45C 9/00* | (2006.01) |
| *A45C 13/10* | (2006.01) |
| *A63B 55/10* | (2006.01) |
| *B62B 1/00* | (2006.01) |
| *B62B 1/26* | (2006.01) |

(Continued)

(52) U.S. Cl.
CPC .............. *A63B 55/30* (2015.10); *A45C 5/14* (2013.01); *A45C 9/00* (2013.01); *A45C 13/103* (2013.01); *A63B 55/10* (2013.01); *A63B 55/40* (2015.10); *A45C 2013/306* (2013.01); *A45C 2200/15* (2013.01); *A63B 71/0045* (2013.01); *A63B 2210/50* (2013.01); *B62B 1/008* (2013.01); *B62B 1/262* (2013.01); *B62B 2202/406* (2013.01); *B62B 2206/006* (2013.01)

(58) Field of Classification Search
CPC ......... A63B 55/30; A63B 55/40; A63B 55/10; A63B 60/62; A45C 2003/007; B62B 1/262
USPC ........ 206/315.1, 315.2, 215.6, 315.6; 190/4; 280/DIG. 6
See application file for complete search history.

(56) References Cited

U.S. PATENT DOCUMENTS

| | | |
|---|---|---|
| 2,551,009 A | 5/1951 | Kaltenbach |
| 2,726,874 A | 12/1955 | Sullivan |

(Continued)

FOREIGN PATENT DOCUMENTS

| | | |
|---|---|---|
| CN | 2225280 Y | 4/1996 |
| WO | 02/24282 A2 | 3/2002 |

OTHER PUBLICATIONS

Copenheaver, Blaine; International Search Report and Written Opinion of the International Searching Authority Issued in Int'l. App. No. PCT/US2018/012329; dated Feb. 26, 2018; 9 pages.

*Primary Examiner* — Sue A Weaver
(74) *Attorney, Agent, or Firm* — Ulmer & Berne LLP (57) ABSTRACT

An equipment caddy is provided that is convertible between a container and an equipment rack.

17 Claims, 5 Drawing Sheets

(51) Int. Cl.
    *A45C 13/30*       (2006.01)
    *A63B 71/00*       (2006.01)

(56) References Cited

U.S. PATENT DOCUMENTS

| | | | |
|---|---|---|---|
| 2,883,207 A * | 4/1959 | Reich | B62B 1/262 |
| | | | 280/47.19 |
| 3,738,677 A | 6/1973 | Renock | |
| 4,182,391 A | 1/1980 | Kjose | |
| 4,905,827 A | 3/1990 | Kim | |
| 4,998,743 A | 3/1991 | Thielen | |
| 5,168,992 A | 12/1992 | Bowdy | |
| 5,228,547 A | 7/1993 | Yoo | |
| 5,845,780 A | 12/1998 | Allen | |
| 6,032,999 A | 3/2000 | York et al. | |
| D436,722 S | 1/2001 | Larko | |
| D468,528 S | 1/2003 | Tornell | |
| 6,966,439 B2 | 11/2005 | Weleczki | |
| 7,147,243 B2 | 12/2006 | Kady | |
| 7,559,423 B2 * | 7/2009 | Vosloo | A45C 11/00 |
| | | | 206/315.1 |
| 9,004,274 B2 * | 4/2015 | Thornberg | A01K 97/08 |
| | | | 206/315.6 |
| 9,326,575 B2 | 5/2016 | Moore | |
| 2002/0074199 A1 * | 6/2002 | Albritton | A45C 7/0095 |
| | | | 190/107 |
| 2005/0082184 A1 | 4/2005 | Lewter | |
| 2006/0207697 A1 | 9/2006 | Greiner | |
| 2010/0038198 A1 | 2/2010 | Jarvis | |
| 2013/0098787 A1 | 4/2013 | Sung | |
| 2014/0158737 A1 * | 6/2014 | Koutouras | A45C 13/02 |
| | | | 224/653 |

\* cited by examiner

CONVERTIBLE SPORTS EQUIPMENT CADDY

REFERENCE TO RELATED APPLICATION

This application claims priority of U.S. provisional patent application Ser. No. 62/442,116, entitled Convertible Sports Equipment Caddy, filed Jan. 4, 2017, and hereby incorporates this provisional patent application by reference herein in its entirety.

TECHNICAL FIELD

The apparatus and methods described below generally relate to a convertible sports equipment caddy. The convertible sports equipment caddy includes a closure panel that is movable between a closed position and a deployed position.

BACKGROUND

A variety of sporting activities use elongated equipment, such as, for example, lacrosse, field hockey, baseball, cricket, or ice hockey. The elongated equipment is often transported in a bag or case.

SUMMARY

In accordance with one embodiment, a convertible sports equipment caddy comprises a main wall, a plurality of sidewalls, and a closure panel. The plurality of sidewalls extend from the main wall. The plurality of sidewalls and the main wall cooperate to define an interior. The closure panel is movably coupled with the main wall and is selectively movable between a closed position and a deployed position. The closure panel comprises an interior surface and at least one anchoring mechanism disposed on the interior surface and configured to selectively retain sporting equipment adjacent to the interior surface. When the closure panel is in the closed position, the closure panel is adjacent the plurality of sidewalls and overlies the interior such that the at least one anchoring mechanism faces the interior. When the closure panel is in the deployed position, the closure panel extends away from the plurality of sidewalls and is disposed adjacent to the interior such that the at least one anchoring mechanism is spaced from the interior.

In accordance with another embodiment, a convertible sports equipment caddy comprises a main wall, a plurality of sidewalls, and a closure panel. The plurality of sidewalls extend from the main wall. The plurality of sidewalls extend from the main wall. The plurality of sidewalls comprise a pair of lateral sidewalls and a lower sidewall extending between the pair of lateral sidewalls. The closure panel is movably coupled with the main wall. The closure panel is selectively movable between a closed position and a deployed position. The closure panel comprises an interior surface and at least one anchoring mechanism disposed on the interior surface and configured to selectively retain sporting equipment adjacent to the interior surface. The pair of lateral sidewalls defines an overall width of the convertible sports equipment caddy. When the closure panel is in the closed position, the lower sidewall and the closure panel cooperate to define a first length of the convertible sports equipment caddy. When the closure panel is in the deployed position, the lower sidewall and the closure panel cooperate to define a second length of the convertible sports equipment caddy. The second length is greater than the first length.

In accordance with yet another embodiment, a golf club caddy comprises a main wall, a plurality of sidewalls, and a closure panel. The plurality of sidewalls extend from the main wall. The plurality of sidewalls comprise a pair of lateral sidewalls and a lower sidewall extending between the pair of lateral sidewalls. The pair of lateral sidewalls, the lower sidewall, and the main wall cooperate to define an interior. The closure panel is movably coupled with the main wall. The closure panel is selectively movable between a closed position and a deployed position. The closure panel comprises an interior surface and a plurality of anchoring mechanisms disposed on the interior surface and configured to selectively retain sporting equipment adjacent to the interior surface. When the closure panel is in the closed position, the closure panel is adjacent the plurality of sidewalls and overlies the interior such that the plurality of anchoring mechanisms faces the interior. When the closure panel is in the deployed position, the closure panel extends away from the plurality of sidewalls and is disposed adjacent to the interior such that the plurality of anchoring mechanisms is spaced from the interior. The pair of lateral sidewalls defines an overall width of the golf club caddy. When the closure panel is in the closed position, the lower sidewall and the closure panel cooperate to define a first length of the golf club caddy. When the closure panel is in the deployed position, the lower sidewall and the closure panel cooperate to define a second length of the golf club caddy. The second length is greater than the first length. The plurality of anchoring mechanisms are arranged substantially parallel to the overall width.

BRIEF DESCRIPTION OF THE DRAWINGS

Various embodiments will become better understood with regard to the following description, appended claims and accompanying drawings wherein:

DETAILED DESCRIPTION

Figure 1:
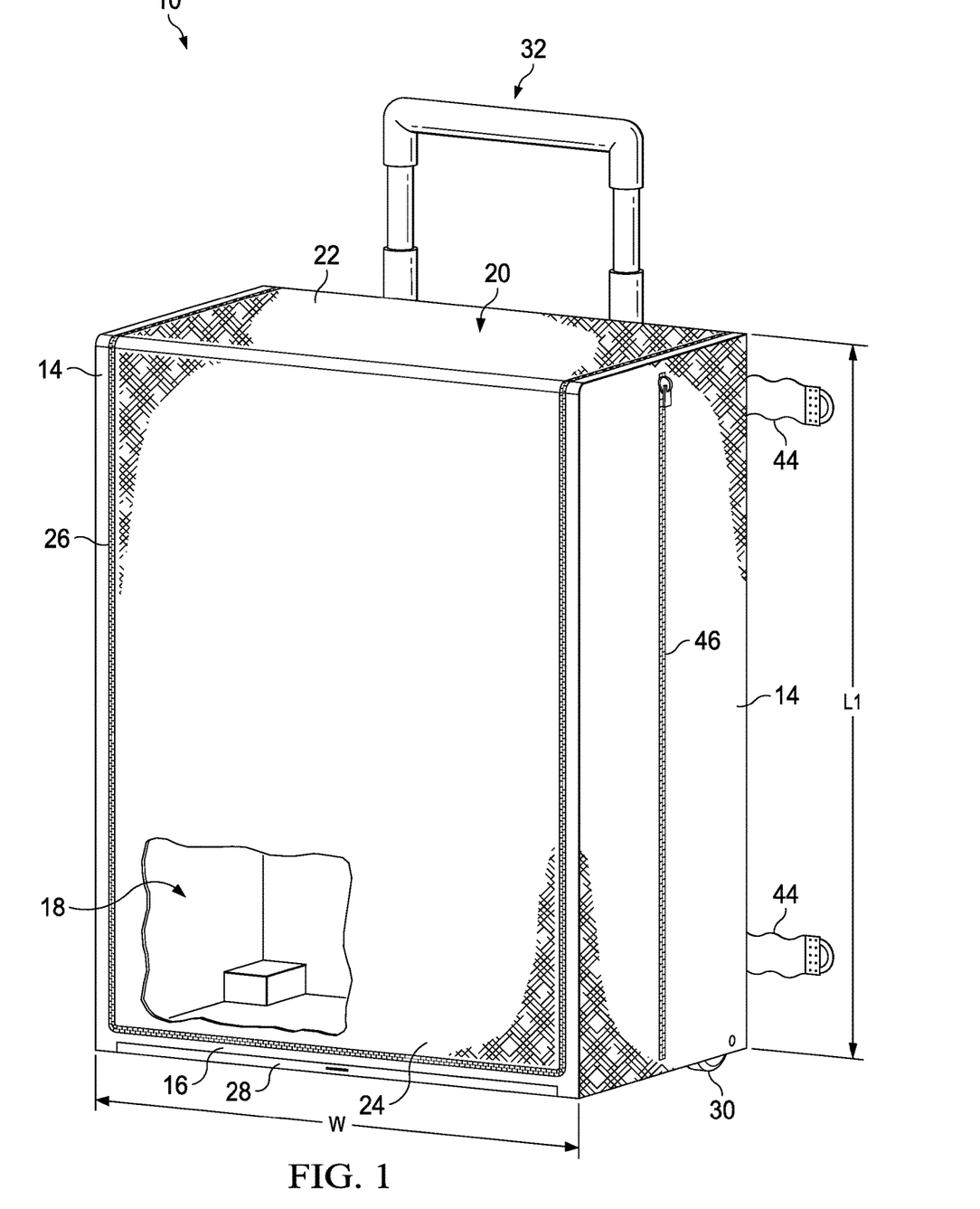
FIG. 1 is a front isometric view depicting a convertible sports equipment caddy according to one embodiment.
Figure 2:
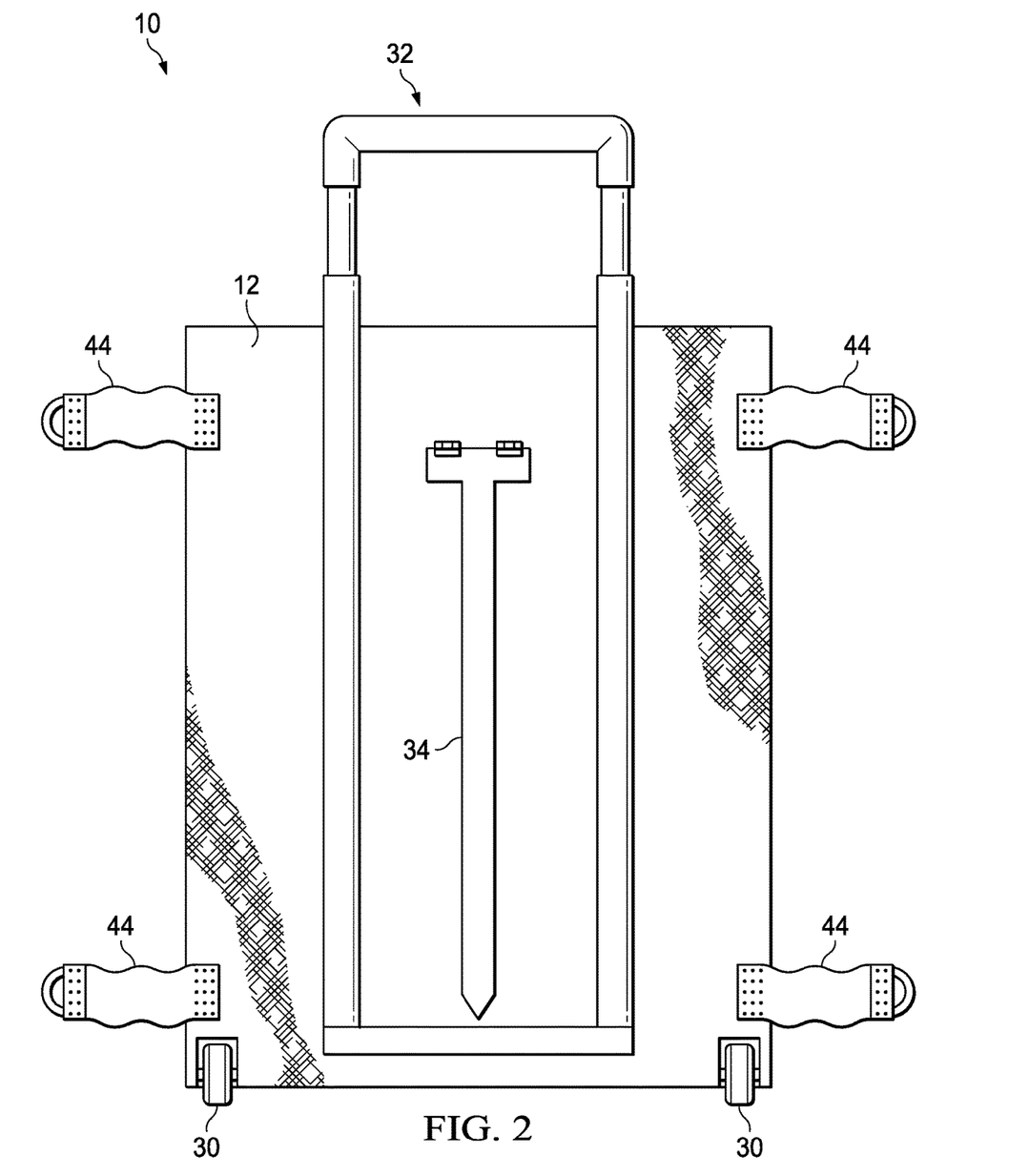
FIG. 2 is a rear view depicting the convertible sports equipment caddy of FIG. 1.
Figure 3:
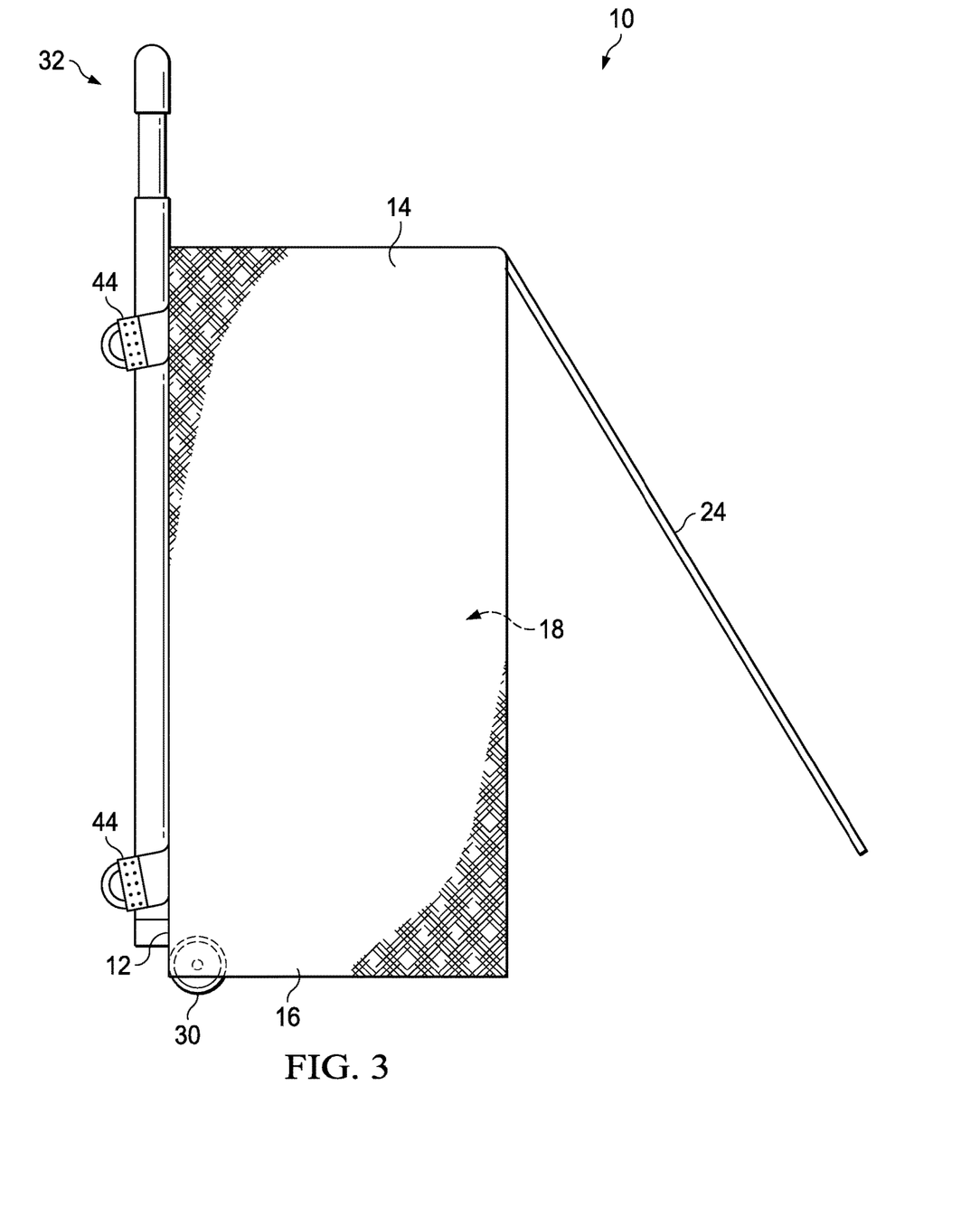
FIG. 3 is a side view depicting the convertible sports equipment caddy of FIG. 1 with a closure panel shown in an opened position.

Embodiments are hereinafter described in detail in connection with the views and examples of FIGS. 1-5, wherein like numbers indicate the same or corresponding elements throughout the views. As illustrated in FIGS. 1-3, a convertible sports equipment caddy 10 (hereinafter "the caddy") can include a main wall 12 (FIG. 2) a pair of lateral sidewalls 14 and a lower sidewall 16. The lateral sidewalls 14 and the lower sidewall 16 can extend from the main wall 12. The lateral sidewalls 14 can be spaced from each other and the lower sidewall 16 can extend between the lateral sidewalls 14. The main wall 12, the lateral sidewalls 14, and the lower sidewall 16 can cooperate to define an interior 18.

The caddy 10 can also include a closure panel 20 that comprises a sidewall portion 22 and a flap portion 24. The closure panel 20 is shown to be in a closed position in FIGS. 1 and 2. When in the closed position, the closure panel 20 can overlie the interior 18 such that the sidewall portion 22 extends between the lateral sidewalls 14 and the flap portion 24 extends between each of the lateral sidewalls 14. As illustrated in FIG. 3, the flap portion 24 can be selectively opened to reveal the interior 18 thus allowing loading and/or retrieval of items to/from the interior 18 of the caddy 10. The interior 18 can be sized to fit a pair of golf shoes as well as other golf accessories, such as, for example, a glove, tees, a swing aid, sunglasses, a hat, or socks. As illustrated in FIG. 2, when the closure panel is in the closed position, the lateral sidewalls 14 can define an overall width W of the caddy 10, and the flap portion 24 of the closure panel 20 can cooperate with the lower sidewall 16 to define a length L1 of the caddy 10.

A zipper 26 can be routed along a perimeter of the closure panel 20 and configured to facilitate selective securement of the closure panel 20 to the lateral sidewalls 14 and the lower sidewall 16 when the closure panel 20 is in the closed position. The zipper 26 can be unzipped to gain access to the interior 18. It is to be appreciated that the closure panel 20 can be additionally or alternatively selectively secured with any of a variety of closure arrangements, such as buttons or straps, for example. A removable tray 28 (FIG. 1) can underlie the interior 18 and can be configured to collect dirt and other debris that might be introduced into the interior 18 (e.g., from the shoes). The removable tray 28 can be slid away from the rest of the caddy 10 and removed to enable the dirt and other debris collected on the removable tray 28 to be disposed of.

Referring now to FIG. 2, the caddy 10 can include a pair of wheels 30 and a telescoping handle 32. A user can selectively extend the telescoping handle 32 by actuating a release mechanism (e.g., a button) (not shown) and pulling the telescoping handle 32 upwardly. The user can then tip the caddy 10 onto the wheels 30, (e.g., FIG. 5), and transport the caddy 10 by pulling the telescoping handle 32. Once the caddy 10 has reached its destination, the user can collapse the telescoping handle 32 for storage by actuating the release mechanism (not shown) and pushing the telescoping handle 32 downwardly. In one embodiment, the caddy 10 can include a kickstand 34 that can be deployed for holding the caddy 10 in a rearward tilted position (e.g., see FIG. 5). The kickstand 34 can include a wheel lock (not shown) that interacts with the wheels 30 when it is deployed to prevent the wheels 30 from rotating. In some embodiments, the kickstand 34 can automatically deploy when the caddy 10 is tilted rearwardly.

Figure 4:
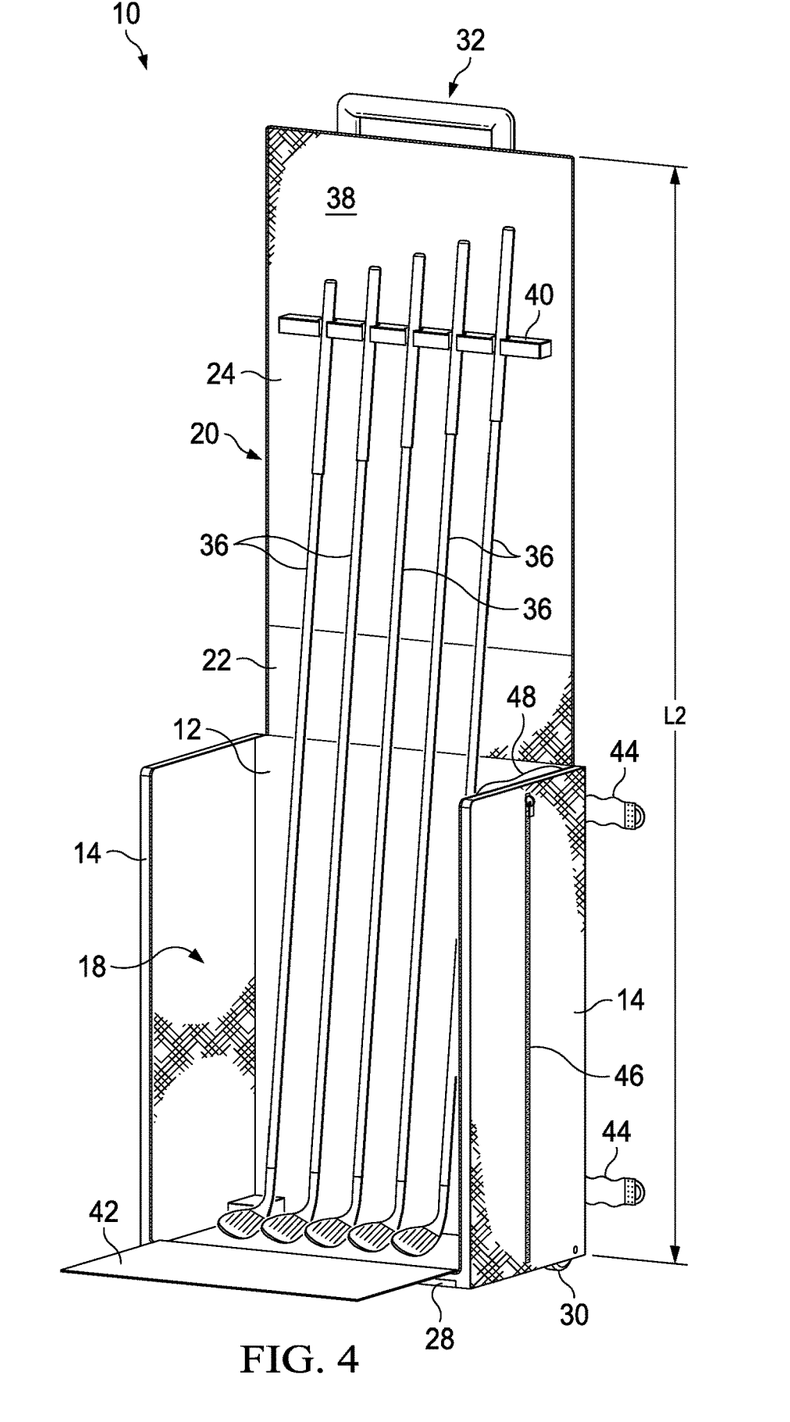
FIG. 4 is a front isometric view depicting the convertible sports equipment caddy of FIG. 1 but with the closure panel shown in a deployed position.
Figure 5:
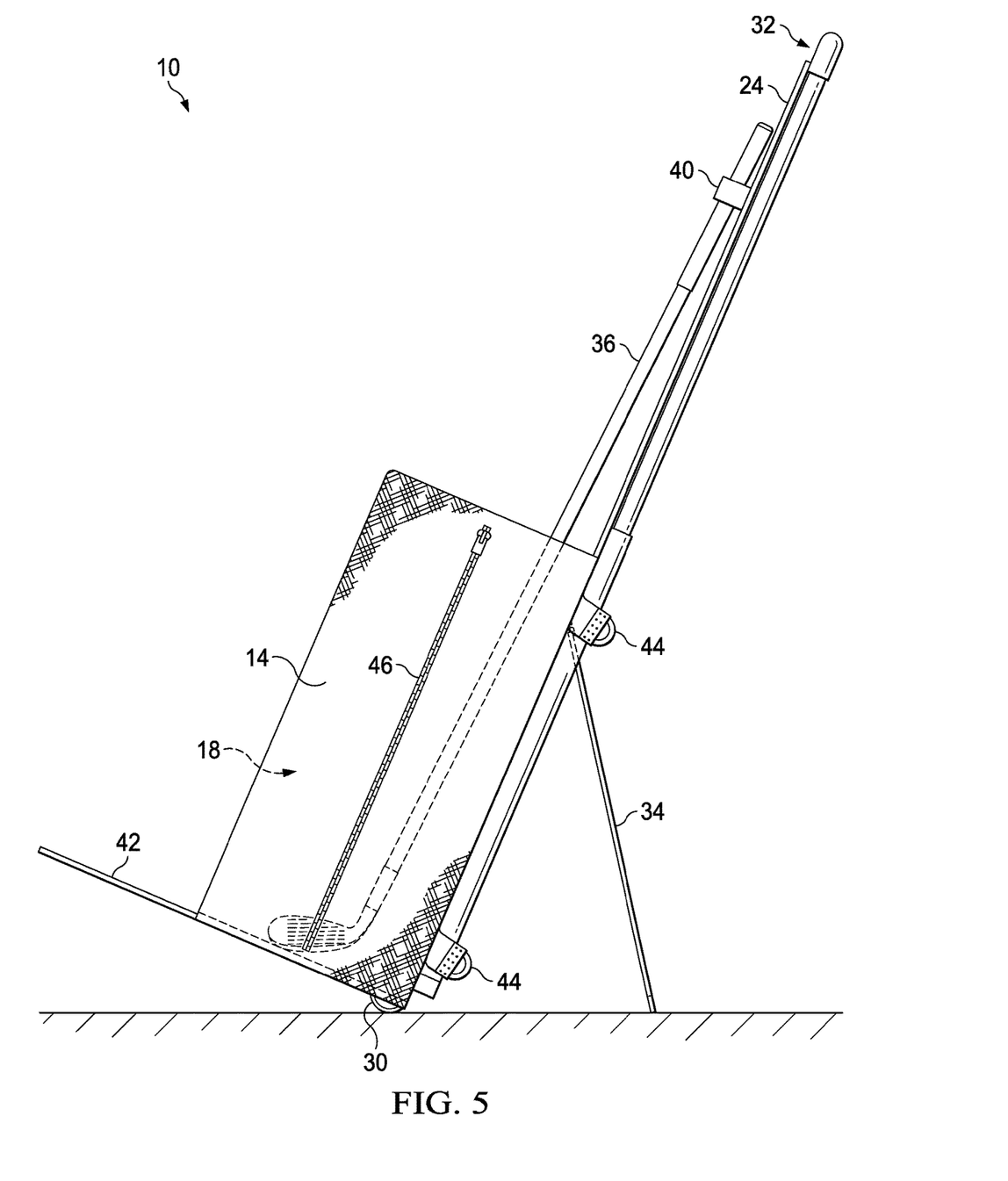
FIG. 5 is a side view depicting the convertible sports equipment caddy of FIG. 1 with a closure panel shown in the deployed position and a kickstand shown in a deployed position.

Referring now to FIGS. 1-5, the closure panel 20 can be pivotally coupled with the main wall 12 and pivotal between the closed position (FIGS. 1-3) and a deployed position (FIGS. 4 and 5). When the closure panel 20 is pivoted to the deployed position, the closure panel 20 lays against (or proximate to) the telescoping handle 32. The sidewall portion 22 and the flap portion 24 thus no longer overlie the interior 18, but instead extend away from the lateral sidewalls 14 such that the sidewall portion 22 and the flap portion 24 are adjacent to the interior 18 and such that the flap portion 24 is disposed between the interior 18 and the sidewall portion 22. In one embodiment, the main wall 12, the sidewall portion 22, and the flap portion 24 can be substantially coplanar. The main wall 12, the sidewall portion 22 and the flap portion 24 accordingly cooperate to provide an elongated area in which to transport golf clubs 36 or other elongated sports equipment. In particular, when the closure panel is in the deployed position, the lower sidewall 16 and the closure panel 20 cooperate to define a length L2 (FIG. 4) of the caddy 10 that is longer than the length L1 (FIG. 1). In one embodiment, the length L2 (FIG. 4) can be at least twice as long as the length L1. In one embodiment, the width W can be about 12 inches, the length L1 can be about 15 inches, and the length L2 can be about 36 inches. As such, the caddy 10 can more compact when in the closed position to allow for effective storage and loading of the caddy 10 in a vehicle.

Referring now to FIGS. 4 and 5, the closure panel 20 can include an interior surface 38 and a plurality of anchoring mechanisms 40 disposed on the interior surface 38. Each anchoring mechanism 40 can be configured to selectively retain a handle of one of the golf clubs 36, or other sporting equipment, adjacent to the interior surface 38 when the golf clubs 36 are lying against the closure panel 20. The anchoring mechanisms 40 are shown to be arranged substantially parallel to the width W of the caddy 10, but can alternatively be provided in any arrangement that facilitates grasping of the golf clubs 36. In one embodiment, some of the anchoring mechanisms 40 can be provided at different heights to accommodate for different length golf clubs (e.g., 36). In one embodiment, each of the anchoring mechanisms 40 can be a spring clamp.

When the closure panel 20 is in the closed position, the anchoring mechanisms 40 can face the interior 18 and can be substantially concealed from the exterior of the caddy 10 and thus less susceptible to damage when the caddy 10 is moved around. In some embodiments, the anchoring mechanisms 40 extend enough from the closure panel 20 such that they are disposed in the interior 18. When the closure panel 20 is in the deployed position, the anchoring mechanisms 40 are spaced away from the interior 18 at a location that facilitates grasping of a handle of the golf clubs 36.

Still referring to FIGS. 4 and 5, the caddy 10 can also include a fold out tray 42 that can be selectively deployed when the golf clubs 36 are being stowed on the caddy 10. The fold out tray 42 can be part of the removable tray 28 or provided in addition or in lieu of the removable tray 28.

It is to be appreciated that a user can selectively convert the caddy 10 between a container (e.g., that is capable of carrying smaller items, such as golf shoes (not shown)) and an equipment rack that can carry golf clubs 36 (FIGS. 4-6) by pivoting the closure panel 20 between the closed position (as illustrated in FIGS. 1-3) and the deployed position (as illustrated in FIGS. 4 and 5), respectively. When converted into a container, the caddy 10 can fit easily in the trunk of a vehicle and can protect its contents (e.g., golf shoes and other small items) from incurring damage. When converted into a golf club rack, the caddy 10 can be easily rolled to a desired location and can allow a user to easily select and use the golf clubs 36 being stored thereon.

The caddy 10 can be particularly useful when used at a practice/driving range. For example, when the user arrives at the practice/driving range, golf shoes can be stored in the caddy 10 and the golf clubs 36 can be stored apart from the caddy 10 (e.g., in a golf bag). The user can retrieve the caddy 10 from the vehicle and can place it on the ground while tilting it back to deploy the kickstand 34. The user can then retrieve the golf shoes and any other desired equipment from the caddy 10 by opening the closure panel 20 and placing the closure panel 20 in the opened and upright position shown in FIGS. 4 and 5. Once the user puts the golf shoes on and has readied any other equipment stored in the interior 18, the user can extend the telescoping handle 32, can deploy the fold out tray 42, and can select various golf clubs 36 from the golf bag for practice. Each of the selected golf clubs 36 can then be loaded onto the fold out tray 42 and engaged with one of the anchoring mechanisms 40. The caddy 10 can then be rolled to the practice area where the user is able to easily retrieve the selected golf clubs 36 from the caddy 10. Once the practice session is complete, the user can roll the caddy 10 back to the vehicle and can remove the golf clubs 36 from the caddy 10 and place them back in the golf bag. The user can then retract the fold out tray 42 and can take off the golf shoes which can be placed on the fold out tray 42 and/or the removable tray 28, together with securing any other items within the interior 18 (e.g., within various pockets distributed throughout). The user can then pull the closure panel 20 into the closed position and can zip up the zipper 26. The user can then remove and empty the removable tray 28 of any debris that has collected thereon and can replace the removable tray 28 in the caddy 10. The user can then retract the telescoping handle 32 and can pick up the caddy 10 (which can automatically retract the kickstand 34) and return it to the vehicle.

In one embodiment, as illustrated in FIG. 3, the caddy 10 can include a pair of straps 44 that can allow a golf bag to be releasably secured thereto such that the caddy 10 can be used as a hand cart when golfing on a golf course. In such an embodiment, the more readily used golf clubs can be stored on the caddy 10 (and not in the golf bag) for easier retrieval by a user.

Referring now to FIGS. 1, 4, and 5, a zipper 46 can be disposed on one of the lateral sidewalls 14 and can provide selective access to a cooler bag 48 (shown in a collapsed arrangement) attached to the lateral sidewall 14 and disposed within the interior 18. The cooler bag 48 can be formed of an insulating material that is configured to insulate the contents of the cooler bag 48 from the outside environment. When the caddy 10 is converted into a container, the interior 18 can be emptied of its contents and the cooler bag 48 can extend into the interior 18 to allow for beverages and/or food to be provided in the cooler bag 48 such that the caddy 10 can be used as a cooler. In one embodiment, the caddy 10 can be configured to fit inside of a storage bin of a golf cart with the zipper 46 facing upwardly such that it is accessible from a seat or a rear end of the golf cart.

It is to be appreciated that, although the caddy 10 has been described for use in a golf environment, the caddy 10 can be used for any of a variety of sporting activities that use elongated equipment, such as, for example, lacrosse, field hockey, baseball, cricket, or ice hockey. For these other sporting activities, it is understood that various of the components of the caddy 10 (e.g., the interior 18, the wheels 30, and the anchoring mechanisms 40) can be configured to accommodate the appropriate equipment. It is also to be appreciated that although the closure panel 20 is described as being pivotally coupled to the main wall 12, the closure panel can be movably coupled with the main wall 12 in any of a variety of suitable alternative arrangements. In one embodiment, the closure panel 20 might be releasably attached to the sidewalls (e.g., 14, 16) (e.g., with clasps) and removable to facilitate movement of the closure panel 20 between the closed and deployed positions.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A convertible sports equipment caddy comprising:
 a main wall;
 a plurality of sidewalls rigidly coupled with the main wall and extending therefrom, the plurality of sidewalls and the main wall cooperating to define an interior therebetween; and
 a closure panel movably coupled with the main wall and selectively movable between a closed position and a deployed position, the closure panel comprising an interior surface and at least one anchoring mechanism fixedly attached to the closure panel and configured to selectively grasp sporting equipment for retention thereof adjacent to the interior surface, wherein:
  when the closure panel is in the closed position, the closure panel contacts the plurality of sidewalls and overlies the interior such that the at least one anchoring mechanism faces is disposed within the interior; and
  when the closure panel is in the deployed position, the closure panel is disposed above the plurality of sidewalls and is substantially coplanar with the main wall such that the at least one anchoring mechanism is spaced from and is disposed above the interior, and the main wall, the plurality of sidewalls, and the closure panel cooperate to define an elongated area that extends continuously between the main wall and the sidewalls and along the interior surface of the closure panel to the at least one anchoring mechanism.

2. The convertible sports equipment caddy of claim 1 further comprising a zipper that is routed along at least a portion of the closure panel and configured to facilitate selective securement of the closure panel to the plurality of sidewalls.

3. The convertible sports equipment caddy of claim 1 wherein:
 the closure panel comprises a sidewall portion and a flap portion;
 when the closure panel is in the closed position, the sidewall portion extends between two sidewalls of the plurality of sidewalls; and
 when the closure panel is in the deployed position, the sidewall portion is disposed between the interior and the flap portion.

4. The convertible sports equipment caddy of claim 1 wherein the at least one anchoring mechanism comprises a spring clamp.

5. The convertible sports equipment caddy of claim 1 further comprising a removable tray disposed adjacent to the interior and configured for selective removal of the removable tray away from the interior.

6. The convertible sports equipment caddy of claim 1 wherein:

the plurality of sidewalls comprises a pair of lateral sidewalls and a lower sidewall;

the pair of lateral sidewalls defines an overall width of the convertible sports equipment caddy;

when the closure panel is in the closed position, the lower sidewall and the closure panel cooperate to define a first length of the convertible sports equipment caddy;

when the closure panel is in the deployed position, the lower sidewall and the closure panel cooperate to define a second length of the convertible sports equipment caddy; and the second length is greater than the first length.

7. The convertible sports equipment caddy of claim 6 wherein the second length is at least twice as long as the first length.

8. A convertible sports equipment caddy comprising:
a main wall;
a plurality of sidewalls extending from the main wall, the plurality of sidewalls comprising a pair of lateral sidewalls and a lower sidewall extending between the pair of lateral sidewalls and cooperating with the main wall to define an interior therebetween; and
a closure panel movably coupled with the main wall, the closure panel being selectively movable between a closed position and a deployed position, the closure panel comprising an interior surface and at least one anchoring mechanism fixedly attached to the closure panel and configured to selectively grasp sporting equipment for retention thereof adjacent to the interior surface, wherein:
the pair of lateral sidewalls defines an overall width of the convertible sports equipment caddy;
when the closure panel is in the closed position, the closure panel contacts the lower sidewall and the plurality of lateral sidewalls and overlies the interior such that the at least one anchoring mechanism is disposed within the interior and such that the lower sidewall and the closure panel cooperate to define a first length of the convertible sports equipment caddy;
when the closure panel is in the deployed position, the closure panel is disposed above the main wall and the plurality of lateral sidewalls and is substantially coplanar with the main wall such that the at least one anchoring mechanism is spaced from and disposed above the interior, and the lower sidewall, the main wall, the plurality of lateral sidewalls, and the closure panel cooperate to define an elongated area that extends continuously between the main wall, the lower sidewall and the lateral sidewalls and along the interior surface of the closure panel to the at least one anchoring mechanism;
when the closure panel is in the deployed position, the lower sidewall and the closure panel cooperate to define a second length of the convertible sports equipment caddy; and
the second length is greater than the first length.

9. The convertible sports equipment caddy of claim 8 wherein the second length is at least twice as long as the first length.

10. The convertible sports equipment caddy of claim 8 further comprising a zipper that is routed along at least a portion of the closure panel and configured to facilitate selective securement of the closure panel to the plurality of sidewalls.

11. The convertible sports equipment caddy of claim 8 wherein:

the closure panel comprises a sidewall portion and a flap portion;

the sidewall portion extends between the pair of lateral sidewalls; and when the closure panel is in the deployed position, the sidewall portion is disposed between the interior and the flap portion.

12. The convertible sports equipment caddy of claim 8 wherein the at least one anchoring mechanism comprises a spring clamp.

13. The convertible sports equipment caddy of claim 8 further comprising a removable tray disposed adjacent to the lower sidewall and configured for selective removal of the removable tray away from the lower sidewall.

14. A golf club caddy comprising:
a main wall;
a plurality of sidewalls extending from the main wall, the plurality of sidewalls comprising a pair of lateral sidewalls and a lower sidewall extending between the pair of lateral sidewalls, the pair of lateral sidewalls, the lower sidewall, and the main wall cooperating to define an interior therebetween; and
a closure panel movably coupled with the main wall, the closure panel being selectively movable between a closed position and a deployed position, the closure panel comprising an interior surface and a plurality of anchoring mechanisms fixedly attached to the closure panel and configured to selectively grasp sporting equipment for retention thereof adjacent to the interior surface, wherein:
when the closure panel is in the closed position, the closure panel contacts the lower sidewall and the plurality of lateral sidewalls and overlies the interior such that the plurality of anchoring mechanisms is disposed within the interior;
when the closure panel is in the deployed position, the closure panel is disposed above the lower sidewall and the plurality of lateral sidewalls and is substantially coplanar with the main wall such that the plurality of anchoring mechanisms is spaced from and disposed above the interior, and the main wall, the lower sidewall, the plurality of sidewalls, and the closure panel cooperate to define an elongated area that extends continuously between the lower sidewall and the plurality of lateral sidewalls and along the interior surface of the closure panel to the at least one anchoring mechanism;
the pair of lateral sidewalls defines an overall width of the golf club caddy;
when the closure panel is in the closed position, the lower sidewall and the closure panel cooperate to define a first length of the golf club caddy;
when the closure panel is in the deployed position, the lower sidewall and the closure panel cooperate to define a second length of the golf club caddy;
the second length is greater than the first length; and
the plurality of anchoring mechanisms are arranged substantially parallel to the overall width.

15. The golf club caddy of claim 14 wherein:
the closure panel comprises a sidewall portion and a flap portion;
the sidewall portion extends between the pair of lateral sidewalls; and
when the closure panel is in the deployed position, the sidewall portion is disposed between the interior and the flap portion.

16. The golf club caddy of claim 14 further comprising a zipper that is routed along at least a portion of the closure panel and configured to facilitate selective securement of the closure panel to the plurality of sidewalls.

17. The golf club caddy of claim 14 wherein the at least one anchoring mechanism comprises a spring clamp.

\* \* \* \* \*

UNITED STATES PATENT AND TRADEMARK OFFICE
CERTIFICATE OF CORRECTION

PATENT NO. : 11,395,944 B2
APPLICATION NO. : 16/342832
DATED : July 26, 2022
INVENTOR(S) : Douglas Matthew Kurzynski It is certified that error appears in the above-identified patent and that said Letters Patent is hereby corrected as shown below:

In the Claims

Column 6, Claim 1, Line 31, change "mechanism faces is disposed" to --mechanism is disposed--.

Signed and Sealed this
Eighth Day of November, 2022

Katherine Kelly Vidal
Director of the United States Patent and Trademark Office